United States Patent

Olds et al.

[15] 3,681,665

[45] Aug. 1, 1972

[54] STATUS INDICATING DISPLAY FOR ELECTRONIC CIRCUIT CARDS

[72] Inventors: Richard G. Olds, Garden City; Frank X. Zammitt, Birmingham, both of Mich.

[73] Assignee: Westinghouse Electric Corporation, Pittsburgh, Pa.

[22] Filed: Feb. 11, 1971

[21] Appl. No.: 114,508

[52] U.S. Cl. ............................317/101 CC, 317/118

[51] Int. Cl. ..............................................H02b 1/04

[58] Field of Search....174/68.5; 317/101 C, 101 CC, 317/101 R, 101 DH, 118; 200/166 PC, 167 A

[56] References Cited

UNITED STATES PATENTS 3,191,097 6/1965 Dano et al...................174/52 X
3,573,558 4/1971 Babcock................317/101 DH
3,201,786 8/1965 Andersen et al..........317/118 X
3,272,951 9/1966 O'Brien...............200/166 PC X

*Primary Examiner*—Lewis H. Myers
*Assistant Examiner*—U. Weldon
*Attorney*—A. T. Stratton and Clement L. McHale

[57] ABSTRACT

A translucent plastic strip having various indicia thereon is positioned along the front edge of an electronic circuit card. A plurality of lamps are electrically connected to selected circuits on the card and are positioned behind the strip to selectively light selected portions of the strip in response to a particular status of the circuits to which they are connected. The indicia on the strip schematically represent various electrical components on a machine which is being controlled by the electronic logic circuitry on the card. The strip is detachably attached to a panel fixedly mounted on the card to permit the strip to be transferred whenever the card is replaced.

11 Claims, 4 Drawing Figures

INVENTORS
RICHARD G. OLDS
FRANK X. ZAMMIT
BY
Barnes, Kisselle, Raisch & Choate
ATTORNEYS

STATUS INDICATING DISPLAY FOR ELECTRONIC CIRCUIT CARDS

This invention relates to electronic circuit cards and more specifically to plug-in type cards which are used in electronic controllers for apparatus such as a machine tool.

An electronic circuit card comprises a plurality of electronic components mounted on a flat, rigid, non-conductive board, usually of glass phenolic. These components are electrically connected together by conductive paths on the card to form one or more electronic circuits. Generally a particular circuit card is designed to perform a particular circuit function, and hence various numbers of different cards are used in constructing a complex electronic controller. The cards are usually rectangularly shaped and arranged in stacked fashion with a control cabinet. Preferably, the electronic circuits on each card terminate in a plurality of flat connector strips at one edge thereof. This edge is insertable into a terminal block within the control cabinet to register each strip with a corresponding electrical terminal in the terminal block. Each terminal is in turn wired within the cabinet to one or more terminals in the same or other terminal blocks in accordance with the design of the controller. In this way the individual circuits of each card are electrically connected to the individual circuits of other cards to properly construct a controller for producing the desired machine operating sequence. The use of circuit cards is particularly desirable in complex electronic circuitry because should a circuit malfunction, it may be conveniently replaced without rewiring any components by simply bodily removing the defective card and inserting a new card with the same circuit thereon.

In the past, indicator lamps have also been mounted on circuit cards. These lamps are arranged to present a visual display of the operating status of the control; that is, the lighting of a given lamp indicates that a particular function is occurring either within the control circuitry or on the machine tool. It is highly desirable that a visual display presents the control status in a format which may be readily understood by an observer so that when a malfunction occurs either in the controller or the machine tool it may be quickly pinpointed.

Therefore, the principal object of this invention is to provide an improved electronic circuit card for an electronic controller which presents visual information concerning the control status in a readily understandable format.

It is also an important object of this invention to provide a visual display for an electronic circuit card which is positioned along the front of the card so as to be in juxtaposition to similar displays on other cards when the cards are installed in a control panel to thereby present information concerning the control status in a readily understandable format.

Another object of the invention is to provide a removable visual display for an electronic circuit card which indicates the operating status of the circuitry on the card and which may be readily transferred to a new card should the card have to be replaced.

Still another object of the invention is the provision of a visual display for an electronic circuit card which indicates the control operating status in a format which may be quickly understood by one familiar with the operation thereof so as to enable malfunctions to be quickly pinpointed and thereby reduce the amount of down-time involved in correcting the malfunction.

Other objects and features of the invention will become apparent in the following description and drawings in which.

Figures 1, 2, 3, 4:
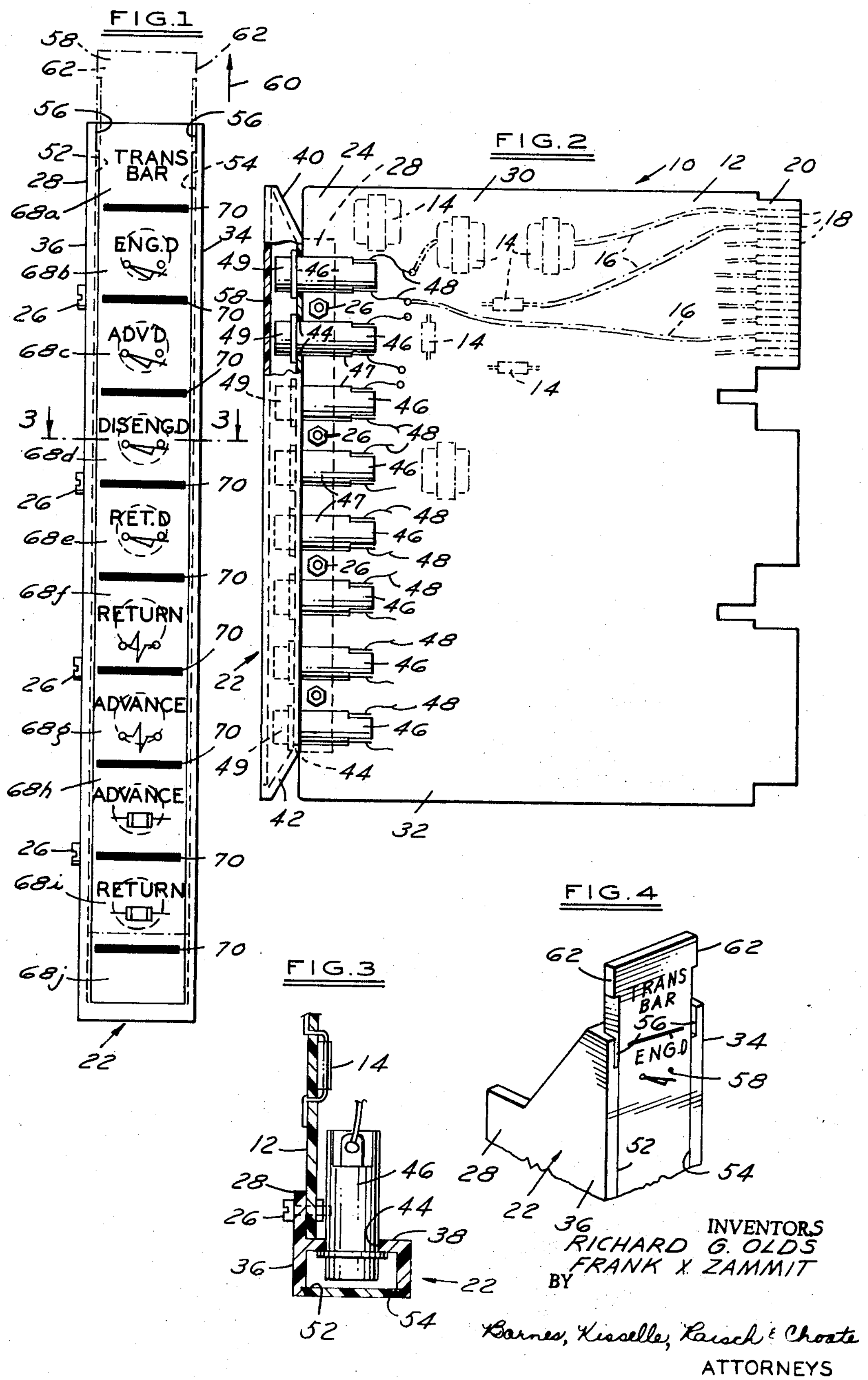
FIG. 1 is a front elevational view of the improved electronic circuit card of the present invention.
FIG. 2 is a side elevational view of the circuit card of FIG. 1 having a portion broken away.
FIG. 3 is a fragmentary sectional view taken along line 3—3 in FIG. 1.
FIG. 4 is a fragmentary perspective view of the top portion of the card of FIG. 1.

Referring now to the drawings, an electronic circuit card 10 comprises a flat, rigid, glass phenolic board 12 of generally rectangular shape and a plurality of various electronic circuit elements 14 mounted thereon. Circuit elements 14 are electrically connected in circuit by various conductive paths 16, some of which terminate in a plurality of conductive strips 18 at the rear border, or edge, 20 of board 12. Edge 20 is adapted to be inserted into a terminal block (not shown) of an electronic controller. A panel 22 is fixedly attached along the front edge, or border, 24 of board 12 by means of fasteners 26 which secure a flange 28 of panel 22 flat against board 12. Panel 22 extends lengthwise from the top border 30 to the bottom border 32 of board 12. Panel 22 extends transversely from the plane of board 12 such that the width of panel 22 is substantially greater than the thickness of board 12. Panel 22 is dished inwardly, or rearwardly, to form two vertical side walls 34 and 36, a vertical rear wall 38 and two inclined end walls 40 and 42. A plurality of circular holes 44 are equally vertically spaced in rear wall 38. An indicator lamp 46 is mounted in each hole 44. Each lamp 46 comprises a socket 47 electrically connected by wires 48 to the circuitry on board 12 and a bulb 49 on the forward end of socket 47 which lights when current is supplied to wires 48. A pair of opposed V-shaped grooves 52 and 54 run lengthwise of panel 22 in each side wall 34 and 36. The upper end of each groove 52 and 54 is notched as at 56. Grooves 52 and 54 retain a rectangular plastic viewing strip 58 which covers the open front of panel 22. Strip 58 may be removed from panel 22 by sliding the strip vertically upwardly as indicated by arrow 60 in FIG. 1. The width of the upper end of strip 58 is slightly enlarged by two tabs 62 which seat within notches 56 when strip 58 is fully inserted into panel 22. Tabs 62 prevent strip 58 from being inserted upside down into panel 22.

Strip 58 is preferably constructed of fairly rigid translucent plastic, and divided into a plurality of windows 68 by successive borders 70 so that each window 68, except the top and bottom windows **68*a* and 68*j*, is directly in front of a bulb 49. Various indicia such as shown in FIG. 1 are inscribed within each window 68 (except window 68*j*). Thus, when a given lamp 46 lights, the indicia within the window 68 in front of it is highlighted so that strip 58 presents a visual display of the status of that portion of the control associated with card 10**.

The operation of the visual display of card 10 in relation to the operation of a portion of a machine tool (not shown) which is being controlled by the circuitry thereon is now described. For purposes of description it will be assumed that the machine tool is a transfer mechanism having a work-gripping member on a reciprocable transfer bar. More specifically, the circuit components 14 on card 10 are electrically connected to various components on the machine tool to advance and return the transfer bar in relation to the engagement and disengagement of the workpieces by the work-gripping member. The indicia within the various windows 68 on strip 58 symbolically and literally indicate the following: window 68*a*, the element of the machine tool which is being controlled by the circuitry on card 10, namely the transfer bar; window 68*b*, an engaged limit switch; window 68*c*, an advanced limit switch; window 68*d*, a disengaged limit switch; window 68*e*, a returned limit switch; window 68*f*, a return solenoid; window 68*g*, an advance solenoid; window 68*h*, a fuse in series with the advance solenoid; window 68*i*, a fuse in series with the return solenoid.

At the beginning of a cycle, the work-gripping member is at the disengaged position tripping the disengaged limit switch and the transfer bar is in the returned position tripping the returned limit switch. Windows 68*d* and 68*e* light to indicate this condition. At the initiation of a cycle the circuitry on another circuit card (not shown) operates to supply voltage to an electrically operated actuator for bringing the work-gripping member into engagement with the workpiece. As the work-gripping member leaves the disengaged position, the light in window 68*d* is extinguished. Engagement of the workpiece by the member trips the engaged limit switch which now supplies a signal to card 10. This signal lights window 68*b* and causes the circuitry on card 10 to supply voltage to the advance solenoid of a solenoid actuated hydraulic valve which operates a power cylinder to advance and return the transfer bar. Because the lamp which illuminates window 68*g* is responsive to the voltage applied to the advance solenoid, window 68*g* lights to indicate that this voltage is being supplied. As the transfer bar advances to thereby shift the workpiece which is being engaged by the work-gripping member, the light in window 68*e* is extinguished. When the transfer bar arrives at the advanced position the advanced limit switch is tripped to light window 68*c*. Simultaneously, in response to actuation of the advanced limit switch, the control circuitry on card 10 de-energizes the advance solenoid. Other circuit cards (not shown) which are also responsive to actuation of the advanced limit switch now operate to disengage the work-gripping member from the workpiece. As the work-gripping member is now shifted, the light in window 68*b* is extinguished, and when the member is at the disengaged position, the disengaged limit switch is tripped. The operation of the disengaged limit switch lights window 68*d* and causes the circuitry on card 10 to supply voltage to the return solenoid of the solenoid actuated valve. The valve now operates the power cylinder to return the transfer bar. As the transfer bar leaves the advanced position, the advanced limit switch is released to thereby extinguish the light in window 68*c*. When the transfer bar arrives at the returned position the returned limit switch is tripped to supply a signal to card 10. In response to the actuation of the returned limit switch, window 68*e* lights and the control circuitry on card 10 de-energizes the return solenoid to also extinguish the light in window 68*f*. This completes the operating cycle.

By observing the illuminated indicia on windows 68 of card 10, an individual who has a familiarity with the machine operating sequence can readily understand the operating status of the control. Even if the control circuitry were more complex and included similar strips 58 on other cards, the particular indicia on the several cards would clearly indicate the control status to an observer who was familiar with the machine operation. Thus, there would be no need to consult a wiring diagram or other informational material when a malfunction occurred in the machine operation. Because the various windows 68 indicate both signals being received from the machine (e.g., from the limit switches) as well as signals being supplied by the electronic control circuitry on cards 10 to the machine (e.g., to the solenoids), the cause of malfunction may be quickly pinpointed.

For example, if the transfer bar fails to advance after the work-gripping member shifts to the engaged position, a quick look at strip 58 would indicate the cause of trouble. If window 68*b* is not lighted it would be apparent that the engaged limit switch has failed to operate properly. On the other hand, if window 68*b* is lighted and window 68*g* is not, it would then be apparent that voltage is not being supplied to the advance solenoid. This would indicate that the malfunction is within the circuitry on card 10 and that card 10 would have to be replaced. Similarly, should both windows 68*b* and 68*g* be lighted, but the transfer bar fail to advance, then a problem in the advance solenoid valve would be indicated. The lighting of window 68*h* would indicate that the fuse in series with the advance solenoid had blown.

The particular advantage of the disclosed visual display resides in the ability to quickly remove strip 58 when a defective card 10 is replaced by a new card. In a complex electronic controller for a machine tool having a large number of electronic circuit cards, many of the circuits associated with particular operating elements of the machine are identical. For example, the basic motion of a turnover device in relation to another machine element may be the same as the relation between the transfer bar and the work-gripping member just described. Therefore, the circuit cards used to perform these functions would be identical except for the different nomenclature involved which is unique to each application. Because strips 58 are removable, circuit cards which are identical with respect to the construction of the electronic circuitry thereon may be used in both applications. Thus, there is no need to fabricate a unique circuit card for the transfer bar and a separate unique circuit card for the turnover device which would differ only in the nomenclature and symbols involved.

We claim:

1. In an electronic circuit card of the type comprising a generally planar board having a forward edge portion, a plurality of electronic components on said board, a plurality of terminals on said board adapted to be engaged with a plurality of corresponding terminals in an electrical panel and means on said board for electrically connecting said components in circuit with said terminals on said board, that improvement which comprises a single strip of translucent material having indicia on selected portions thereof, a support panel positioned adjacent said forward edge portion of said board and fixedly attached to said board and means on said support panel for detachably attaching said strip thereon, said strip being detachably supported on said panel so as to extend lengthwise of said front edge portion, the length of said strip being substantially co-extensive with the length of said front edge portion, lighting means electrically connected with selected circuits on said board for selectively lighting said selected portions of said strip in response to the electrical status of the circuitry on said board to which said lighting means is electrically connected.

2. The circuit card of claim 1 wherein said strip is generally flat and lies in a plane generally perpendicular to the plane of said board.

3. The circuit card of claim 1 wherein said panel comprises means for mounting said lighting means behind said strip.

4. The circuit card of claim 2 wherein said panel comprises a pair of transversely spaced apart side walls and means on said side walls for detachably supporting said strip thereon, said lighting means being positioned between said side walls and behind said said strip.

5. The circuit card of claim 2 wherein said panel is dished rearwardly to form a rear wall extending transversely from the plane of said board and transversely spaced apart side walls extending forwardly from said rear wall to define a hollow dished portion and wherein said strip is spaced forwardly of said rear wall to cover at least a portion of said hollow dished portion, said lighting means being positioned within said hollow dished portion.

6. The circuit card of claim 5 wherein said rear wall includes means for mounting said lighting means.

7. The circuit card of claim 4 wherein said means for detachably supporting said strip on said side walls comprises a pair of opposed parallel grooves formed in the inner opposed surfaces of said side walls and engageable with the opposite side edges of said strip.

8. The circuit card of claim 7 wherein each of said grooves extends lengthwise from a lengthwise end of said side walls for substantially the entire length thereof and wherein said strip slidably engages said grooves.

9. The circuit card of claim 8 wherein said panel further comprises a rear wall connecting the rear edges of said side walls and extending lengthwise of said panel, said rear wall including means for mounting said lighting means thereon such that said lighting means is positioned behind said strip.

10. The circuit card of claim 1 wherein said indicia comprise symbolic representations of various devices adapted to be controlled by the circuitry on said board.

11. The circuit card of claim 1 wherein said lighting means comprises a plurality of lamps, each of said lamps being electrically connected to a circuit on said card and positioned behind one of said selected portions on said strip for highlighting the indicia on said one portion whenever the lamp is illuminated.

* * * * *